(12) United States Patent
Eickhoff

(10) Patent No.: US 9,478,816 B2
(45) Date of Patent: Oct. 25, 2016

(54) SHAPED FUEL SOURCE AND FUEL CELL

(71) Applicant: Honeywell International Inc., Morris Plains, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/002,613

(22) Filed: Jan. 21, 2016

(65) Prior Publication Data

US 2016/0226087 A1 Aug. 4, 2016

Related U.S. Application Data

(63) Continuation of application No. 12/705,423, filed on Feb. 12, 2010, now Pat. No. 9,276,285, which is a continuation-in-part of application No. 12/335,352, filed on Dec. 15, 2008, now Pat. No. 8,962,211.

(51) Int. Cl.
*H01M 4/00* (2006.01)
*H01M 8/06* (2016.01)
*H01M 8/04* (2016.01)

(52) U.S. Cl.
CPC ......... *H01M 8/065* (2013.01); *H01M 8/04216* (2013.01)

(58) Field of Classification Search
CPC ...................................................... H01M 4/00
See application file for complete search history.

(56) References Cited

U.S. PATENT DOCUMENTS

| | | | |
|---|---|---|---|
| 2,935,382 A | 5/1960 | Osborn et al. |
| 3,133,837 A | 5/1964 | Eidensohn |
| 3,765,946 A | 10/1973 | Werner et al. |
| 3,931,395 A | 1/1976 | Beckert et al. |
| 3,994,697 A | 11/1976 | Burke |
| 4,048,385 A | 9/1977 | Regnaut |
| 4,138,089 A | 2/1979 | McCarthy |
| 4,155,712 A | 5/1979 | Taschek |
| 4,261,955 A | 4/1981 | Bailey, Jr. et al. |
| 4,476,196 A | 10/1984 | Poeppel et al. |
| 4,476,197 A | 10/1984 | Herceg |
| 4,596,748 A | 6/1986 | Katz et al. |

(Continued)

FOREIGN PATENT DOCUMENTS

| | | |
|---|---|---|
| DE | 19734259 A1 | 2/1999 |
| EP | 1351329 A1 | 10/2003 |

(Continued)

OTHER PUBLICATIONS

"U.S. Appl. No. 11/592,692, Non-Final Office Action mailed Jul. 23, 2010", 9 pgs.

(Continued)

*Primary Examiner* — Jacob Marks
(74) *Attorney, Agent, or Firm* — Schwegman Lundberg & Woessner, P.A.

(57) ABSTRACT

An example fuel cell assembly may include a shaped fuel source that is formed into a desired shape. The shaped fuel source may have an outer surface, and a fuel cell may be mounted directly on the outer surface of the shaped fuel source. In some instances, the fuel cell assembly may also include one or more of a cathode cap, an anode cap, a refill port, and an outer shell disposed around an exterior of the fuel cell assembly, but these are not required.

12 Claims, 1 Drawing Sheet

(56) References Cited

U.S. PATENT DOCUMENTS

| | | | |
|---|---|---|---|
| 4,629,664 A | 12/1986 | Tsukui et al. |
| 4,659,559 A | 4/1987 | Struthers |
| 4,826,741 A | 5/1989 | Aldhart et al. |
| 4,857,420 A | 8/1989 | Maricle et al. |
| 4,876,163 A | 10/1989 | Reichner |
| 4,906,536 A | 3/1990 | Simonton |
| 4,910,100 A | 3/1990 | Nakanishi et al. |
| 5,248,125 A | 9/1993 | Fritch et al. |
| 5,298,341 A | 3/1994 | Khandkar et al. |
| 5,372,617 A | 12/1994 | Kerrebrock et al. |
| 5,443,616 A | 8/1995 | Congdon |
| 5,449,697 A | 9/1995 | Noaki et al. |
| 5,534,363 A | 7/1996 | Sprouse et al. |
| 5,789,100 A | 8/1998 | Burroughs et al. |
| 5,804,329 A | 9/1998 | Amendola |
| 5,836,750 A | 11/1998 | Cabuz et al. |
| 5,849,046 A | 12/1998 | Bailey |
| 5,851,689 A | 12/1998 | Chen |
| 5,861,221 A | 1/1999 | Ledjeff et al. |
| 5,948,558 A | 9/1999 | Amendola |
| 5,974,235 A | 10/1999 | Nunally et al. |
| 5,992,857 A | 11/1999 | Ueda et al. |
| 6,052,124 A | 4/2000 | Stein et al. |
| 6,054,234 A | 4/2000 | Weiss et al. |
| 6,093,501 A | 7/2000 | Werth |
| 6,127,058 A | 10/2000 | Pratt et al. |
| 6,179,986 B1 | 1/2001 | Swette et al. |
| 6,250,078 B1 | 6/2001 | Amendola et al. |
| 6,265,093 B1 | 7/2001 | Surampudi et al. |
| 6,268,076 B1 | 7/2001 | Dickmann et al. |
| 6,280,869 B1 | 8/2001 | Chen |
| 6,303,244 B1 | 10/2001 | Surampudi et al. |
| 6,307,605 B1 | 10/2001 | Bailey |
| 6,326,097 B1 | 12/2001 | Hockaday |
| 6,406,808 B1 | 6/2002 | Pratt et al. |
| 6,413,665 B1 | 7/2002 | Blanchet et al. |
| 6,428,680 B1 | 8/2002 | Kreichauf |
| 6,432,566 B1 | 8/2002 | Condit et al. |
| 6,433,129 B1 | 8/2002 | Amendola et al. |
| 6,434,278 B1 | 8/2002 | Hashimoto |
| 6,468,694 B1 | 10/2002 | Amendola |
| 6,471,850 B2 | 10/2002 | Shiepe et al. |
| 6,497,973 B1 | 12/2002 | Amendola |
| 6,506,510 B1 | 1/2003 | Sioui et al. |
| 6,506,511 B1 | 1/2003 | Lakeman et al. |
| 6,508,195 B1 | 1/2003 | Tipaldo |
| 6,524,450 B1 | 2/2003 | Hara |
| 6,524,542 B2 | 2/2003 | Amendola et al. |
| 6,534,033 B1 | 3/2003 | Amendola et al. |
| 6,535,658 B1 | 3/2003 | Mendoza et al. |
| 6,541,149 B1 | 4/2003 | Maynard et al. |
| 6,544,679 B1 | 4/2003 | Petillo et al. |
| 6,586,563 B1 | 7/2003 | Ortega et al. |
| 6,596,236 B2 | 7/2003 | DiMeo, Jr. et al. |
| 6,610,193 B2 | 8/2003 | Schmitman |
| 6,620,542 B2 | 9/2003 | Pan |
| 6,632,554 B2 | 10/2003 | Doshi et al. |
| 6,638,654 B2 | 10/2003 | Jankowksi et al. |
| 6,645,651 B2 | 11/2003 | Hockaday et al. |
| 6,670,444 B2 | 12/2003 | Amendola et al. |
| 6,672,078 B2 | 1/2004 | Ovshinsky et al. |
| 6,683,025 B2 | 1/2004 | Amendola et al. |
| 6,706,909 B1 | 3/2004 | Snover et al. |
| 6,727,012 B2 | 4/2004 | Chen et al. |
| 6,728,422 B1 | 4/2004 | Weiss |
| 6,760,488 B1 | 7/2004 | Moura et al. |
| 6,801,136 B1 | 10/2004 | Goodman et al. |
| 6,804,949 B2 | 10/2004 | Andrews et al. |
| 6,833,207 B2 | 12/2004 | Joos et al. |
| 6,852,436 B2 | 2/2005 | Badding et al. |
| 6,866,806 B2 | 3/2005 | Andrews et al. |
| 6,932,847 B2 | 8/2005 | Amendola et al. |
| 6,939,529 B2 | 9/2005 | Strizki et al. |
| 6,942,941 B2 | 9/2005 | Blunk et al. |
| 6,950,030 B2 | 9/2005 | Kovarik et al. |
| 6,953,009 B2 | 10/2005 | Reinke et al. |
| 6,977,123 B1 | 12/2005 | Burroughs et al. |
| 7,001,681 B2 | 2/2006 | Wood |
| 7,019,105 B2 | 3/2006 | Amendola et al. |
| 7,049,024 B2 | 5/2006 | Leban |
| 7,073,368 B2 | 7/2006 | Wood et al. |
| 7,083,657 B2 | 8/2006 | Mohring et al. |
| 7,105,033 B2 | 9/2006 | Strizki et al. |
| 7,108,777 B2 | 9/2006 | Xu et al. |
| 7,128,997 B2 | 10/2006 | Harding et al. |
| 7,322,205 B2 | 1/2008 | Bourne et al. |
| 7,367,334 B2 | 5/2008 | Faison, Jr. et al. |
| 7,524,342 B2 | 4/2009 | Brinkley, III |
| 7,527,885 B2 | 5/2009 | Toukura |
| 7,691,527 B2 | 4/2010 | Petillo et al. |
| 7,807,131 B2 | 10/2010 | Eickhoff |
| 8,557,479 B2 | 10/2013 | Eickhoff et al. |
| 8,932,780 B2 | 1/2015 | Eickhoff |
| 8,962,211 B2 | 2/2015 | Eickhoff |
| 9,065,128 B2 | 6/2015 | Eickhoff |
| 2001/0012494 A1 | 8/2001 | Kreichauf |
| 2001/0028973 A1 | 10/2001 | Ong et al. |
| 2002/0068213 A1 | 6/2002 | Kaiser et al. |
| 2002/0114983 A1* | 8/2002 | Frank ............... H01M 16/006 429/9 |
| 2002/0154310 A1 | 10/2002 | DiMeo, Jr. et al. |
| 2002/0177031 A1 | 11/2002 | Doshi et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0157018 A1 | 8/2003 | Zaluski et al. |
| 2003/0235728 A1 | 12/2003 | Van Zee et al. |
| 2004/0009379 A1 | 1/2004 | Amendola et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0053100 A1 | 3/2004 | Stanley et al. |
| 2004/0101740 A1 | 5/2004 | Sanders |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2004/0209133 A1 | 10/2004 | Hirsch et al. |
| 2004/0215407 A1 | 10/2004 | Thielman et al. |
| 2005/0022883 A1 | 2/2005 | Adams et al. |
| 2005/0079128 A1 | 4/2005 | DeVos et al. |
| 2005/0118469 A1 | 6/2005 | Leach et al. |
| 2005/0132640 A1 | 6/2005 | Kelly et al. |
| 2005/0135996 A1 | 6/2005 | Ortega et al. |
| 2005/0136300 A1 | 6/2005 | Dyer |
| 2005/0142410 A1 | 6/2005 | Higashi et al. |
| 2005/0158595 A1 | 7/2005 | Marsh et al. |
| 2005/0166812 A1 | 8/2005 | Noll et al. |
| 2005/0181245 A1 | 8/2005 | Bonne et al. |
| 2005/0199546 A1 | 9/2005 | Rusta-Sallehy et al. |
| 2005/0238573 A1 | 10/2005 | Zhang et al. |
| 2005/0249993 A1 | 11/2005 | Horiuchi et al. |
| 2005/0260461 A1 | 11/2005 | Wood et al. |
| 2005/0262924 A1 | 12/2005 | Wood et al. |
| 2005/0268555 A1 | 12/2005 | Amendola et al. |
| 2005/0276746 A1 | 12/2005 | Zhang et al. |
| 2006/0014059 A1 | 1/2006 | Wood |
| 2006/0021279 A1 | 2/2006 | Mohring et al. |
| 2006/0040152 A1 | 2/2006 | Wood |
| 2006/0102489 A1 | 5/2006 | Kelly |
| 2006/0102491 A1 | 5/2006 | Kelly et al. |
| 2006/0127722 A1 | 6/2006 | Nakajima et al. |
| 2006/0144701 A1 | 7/2006 | Kelly |
| 2006/0174952 A1 | 8/2006 | Curello et al. |
| 2006/0210850 A1 | 9/2006 | Abouatallah et al. |
| 2006/0261349 A1 | 11/2006 | Doering et al. |
| 2007/0026282 A1 | 2/2007 | Kumagai et al. |
| 2007/0104996 A1 | 5/2007 | Eickhoff et al. |
| 2007/0105008 A1 | 5/2007 | Gu et al. |
| 2007/0141440 A1 | 6/2007 | Yang et al. |
| 2007/0190400 A1 | 8/2007 | Buche et al. |
| 2007/0217994 A1 | 9/2007 | Amendola et al. |
| 2007/0259227 A1 | 11/2007 | Oishi et al. |

(56) References Cited

U.S. PATENT DOCUMENTS

| | | |
|---|---|---|
| 2007/0269698 A1 | 11/2007 | Gu |
| 2007/0271844 A1 | 11/2007 | Mohring et al. |
| 2007/0275291 A1 | 11/2007 | Gu et al. |
| 2007/0277870 A1 | 12/2007 | Wechsler |
| 2007/0287059 A1 | 12/2007 | Eickhoff et al. |
| 2008/0003484 A1 | 1/2008 | Chen et al. |
| 2008/0057378 A1 | 3/2008 | Kang et al. |
| 2008/0090129 A1 | 4/2008 | Kunz et al. |
| 2008/0107930 A1 | 5/2008 | Eickhoff et al. |
| 2008/0124609 A1 | 5/2008 | Sasahara et al. |
| 2008/0160383 A1 | 7/2008 | Shen et al. |
| 2008/0199740 A1 | 8/2008 | Giddey et al. |
| 2008/0220300 A1 | 9/2008 | Jones et al. |
| 2008/0233462 A1 | 9/2008 | Curello et al. |
| 2008/0241635 A1 | 10/2008 | Sato et al. |
| 2008/0268299 A1 | 10/2008 | Eickhoff et al. |
| 2008/0274393 A1 | 11/2008 | Markoski et al. |
| 2008/0280169 A1 | 11/2008 | Niu et al. |
| 2008/0280183 A1 | 11/2008 | Eun et al. |
| 2009/0113795 A1 | 5/2009 | Eickhoff |
| 2010/0151283 A1 | 6/2010 | Eickhoff |
| 2014/0295327 A1 | 10/2014 | Eickhoff |
| 2015/0096670 A1 | 4/2015 | Eickhoff |

FOREIGN PATENT DOCUMENTS

| | | | |
|---|---|---|---|
| EP | 1372205 | A2 | 12/2003 |
| EP | 1496561 | A2 | 1/2005 |
| EP | 1372205 | A3 | 7/2005 |
| EP | 1372205 | B1 | 10/2008 |
| EP | 2055669 | A2 | 5/2009 |
| EP | 2055669 | A3 | 5/2009 |
| EP | 2056382 | A2 | 5/2009 |
| GB | 723180 | A1 | 2/1955 |
| GB | 216446 | A | 3/1986 |
| JP | 57138782 | A | 8/1982 |
| JP | 60000066 | A | 1/1985 |
| JP | 4342439 | A | 11/1992 |
| JP | 9326259 | A | 12/1997 |
| WO | WO-0035032 | A1 | 6/2000 |
| WO | WO-0045457 | A2 | 8/2000 |
| WO | WO-0185606 | A1 | 11/2001 |
| WO | WO-03084866 | A2 | 10/2003 |
| WO | WO-2004025750 | A2 | 3/2004 |
| WO | WO-2004035464 | A2 | 4/2004 |
| WO | WO-2004075375 | A1 | 9/2004 |
| WO | WO-2005004273 | A2 | 1/2005 |
| WO | WO-2005013403 | A2 | 2/2005 |
| WO | WO-2006113469 | A1 | 10/2006 |

OTHER PUBLICATIONS

"U.S. Appl. No. 11/592,692, Preliminary Amendment filed Nov. 3, 2006", 3 pgs.

"U.S. Appl. No. 11/592,692, Response filed Apr. 28, 2010 to Restriction Requirement mailed Mar. 31, 2010", 7 pgs.

"U.S. Appl. No. 11/592,692, Restriction Requirement mailed Mar. 31, 2010", 6 pgs.

"U.S. Appl. No. 11/606,758, Final Office Action mailed Jun. 10, 2009", 10 pgs.

"U.S. Appl. No. 11/606,758, Final Office Action mailed Sep. 15, 2010", 9 pgs.

"U.S. Appl. No. 11/606,758, Non-Final Office Action mailed Mar. 25, 2010", 11 pgs.

"U.S. Appl. No. 11/606,758, Non-Final Office Action mailed May 12, 2008", 13 pgs.

"U.S. Appl. No. 11/606,758, Non-Final Office Action mailed Nov. 13, 2009", 11 pgs.

"U.S. Appl. No. 11/606,758, Non-Final Office Action mailed Nov. 24, 2008", 10 pgs.

"U.S. Appl. No. 11/606,758, Response filed Jan. 4, 2010 to Non Final Office Action mailed Nov. 13, 2009", 12 pgs.

"U.S. Appl. No. 11/606,758, Response filed Feb. 7, 2008 to Restriction Requirement mailed Jan. 7, 2008", 6 pgs.

"U.S. Appl. No. 11/606,758, Response filed Feb. 24, 2009 to Non Final Office Action mailed Nov. 24, 2008", 9 pgs.

"U.S. Appl. No. 11/606,758, Response filed Jun. 21, 2010 to Non Final Office Action mailed Mar. 25, 2010", 12 pgs.

"U.S. Appl. No. 11/606,758, Response filed Aug. 12, 2008 to Non-Final Office Action mailed May, 12, 2008", 11 pgs.

"U.S. Appl. No. 11/606,759, Response filed Sep. 10, 2009 to Final Office Action mailed Jun. 10, 2009", 12 pgs.

"U.S. Appl. No. 11/606,759, Restriction Requirement mailed Jan. 7, 2008", 6 pgs.

"U.S. Appl. No. 12/335,352, Advisory Action mailed Jun. 6, 2012", 3 pgs.

"U.S. Appl. No. 12/335,352, Final Office Action mailed Apr. 27, 2012", 12 pgs.

"U.S. Appl. No. 12/335,352, Non Final Office Action mailed Dec. 23, 2011", 9 pgs.

"U.S. Appl. No. 12/335,352, Notice of Allowability mailed Jan. 28, 2015", 4 pgs.

"U.S. Appl. No. 12/335,352, Notice of Allowability mailed Aug. 25, 2014", 4 pgs.

"U.S. Appl. No. 12/335,352, Notice of Allowance mailed Mar. 14, 2014", 8 pgs.

"U.S. Appl. No. 12/335,352, Preliminary Amendment filed Dec. 15, 2008", 3 pgs.

"U.S. Appl. No. 12/335,352, Response filed Jan. 27, 2012 to Non Final Office Action mailed Dec. 23, 2011", 12 pgs.

"U.S. Appl. No. 12/335,352, Response filed May 16, 2012 to Final Office Action mailed Apr. 27, 2012", 14 pgs.

"U.S. Appl. No. 12/335,352, Response fiied Nov. 8, 2011 to Restriction Requirement mailed Oct. 12, 2011", 6 pgs.

"U.S. Appl. No. 12/335,352, Restriction Requirement mailed Oct. 12, 2011", 5 pgs.

"U.S. Appl. No. 12/705,383 , Response filed May 29, 2013 to Non Final Office Action mailed Mar. 29, 2013", 13 pgs.

"U.S. Appl. No. 12/705,383, Advisory Action mailed Jul. 5, 2013", 2 pgs.

"U.S. Appl. No. 12/705,383, Non Final Office Action mailed Oct. 3, 2012", 9 pgs.

"U.S. Appl. No. 12/705,383, Notice of Allowance mailed Sep. 12, 2014", 8 pgs.

"U.S. Appl. No. 12/705,423, Advisory Action mailed May 10, 2013", 3 pgs.

"U.S. Appl. No. 12/705,423, Final Office Action mailed Feb. 19, 2013", 7 pgs.

"U.S. Appl. No. 12/705,423, Final Office Action mailed Nov. 8, 2013", 8 pgs.

"U.S. Appl. No. 12/705,423, Non Final Office Action mailed May, 8, 2015", 4 pgs.

"U.S. Appl. No. 12/705,423, Non Final Office Action mailed Jul. 8, 2013", 8 pgs.

"U.S. Appl. No. 12/705,423, Non Final Office Action mailed Sep. 6, 2012", 6 pgs.

"U.S. Appl. No. 12/705,423, Non Final Office Action mailed Oct. 6, 2014", 10 pgs.

"U.S. Appl. No. 12/705,423, Notice of Allowance mailed Oct. 22, 2015", 7 pgs.

"U.S. Appl. No. 12/705,423, Preliminary Amendment filed Feb. 10, 2011", 6 pgs.

"U.S. Appl. No. 12/705,423, RCE and Response filed May 20, 2013 to Final Office Action mailed Feb. 19, 2013", 12 pgs.

"U.S. Appl. No. 12/705,423, Response filed Jan. 6, 2015 to Non Final Office Action mailed Oct. 6, 2014", 7 pgs.

"U.S. Appl. No. 12/705,423, Response filed Feb. 6, 2014 to Final Office Action mailed Nov. 8, 2013", 14 pgs.

"U.S. Appl. No. 12/705,423, Response filed Feb. 10, 2014 to Final Office Action mailed Nov. 8, 2013", 16 pgs.

"U.S. Appl. No. 12/705,423, Response filed Apr. 19, 2013 to Final Office Action mailed Feb. 19, 2013", 10 pgs.

"U.S. Appl. No. 12/705,423, Response filed Aug. 1, 2012 to Restriction Requirement mailed Jul. 16, 2012", 5 pgs.

(56) References Cited

OTHER PUBLICATIONS

"U.S. Appl. No. 12/705,423, Response filed Aug. 5, 2015 to Non Final Office Action mailed May 8, 2015", 7 pgs.
"U.S. Appl. No. 12/705,423, Response filed Oct. 8, 2013 to Non Final Office Action mailed Jul. 8, 2013", 11 pgs.
"U.S. Appl. No. 12/705,423, Response filed Oct. 16, 2012 to Non Final Office Action mailed Sep. 6, 2012", 8 pgs.
"U.S. Appl. No. 12/705,423, Restriction Requirement mailed Jul. 16, 2012", 5 pgs.
"U.S. Appl. No. 12/829,082, Non Final Office Action mailed Sep. 24, 2012", 9 pgs.
"U.S. Appl. No. 12/829,082, Notice of Allowance mailed May, 20, 2013", 9 pgs.
"U.S. Appl. No. 14/300,888, Notice of Allowability mailed Apr. 16, 2015", 5 pgs.
"U.S. Appl. No. 14/300,888, Notice of Allowance mailed Feb. 18, 2015", 8 pgs.
"U.S. Appl. No. 14/300,888, Supplemental Preliminary Amendment filed Jun. 20, 2014", 5 pgs.
"U.S. Appl. No. 12/705,383, Response filed Aug. 30, 2012 to Restriction Requirement mailed Aug. 23, 2012", 7 pgs.
"U.S. Appl. No. 12/705,383, Restriction Requirement mailed Aug. 23, 3012", 5 pgs.
"U.S. Appl. No. 14/570,364, Preliminary Amendment filedd Dec. 16, 2014", 5 pgs.
"European Application Serial No. 11154088.6, European Search Report mailed May 23, 2011", 3 pgs.
"European Application Serial No. 11154088.6, Office Action mailed Aug. 22, 2011", 2 pgs.
"European Application Serial No. 11154088.6, Response filed Sep. 12, 2011 to Office Action mailed May 30, 2010", 12 pgs.
"European Application Serial No. 11154088.6,Office Action mailed May 30, 2011", 5 pgs.
"Hobby RC Industry Leaps into the Future with Hydrogen Power", Horizon Fuel Cell Technologies, [online]. Retrieved from the Internet: <URL: http://www.horizonfuelcell.com/files/HorizonpressreleasehcellFeb2010.pdf>, (Feb. 3, 2010), 2 pgs.
"International Application Serial No. PCT/US2007/085766, International Search Report mailed Apr. 2, 2008", 4 pgs.
"International Application Serial No. PCT/US2007/085766, Written Opinion mailed Apr. 2, 2008", 6 pgs.
Aiello, R. et al., "Production of Hydrogen from Chemical hydrides via hydrolysis with steam", International Journal of Hydrogen Energy, 24, (1999), 1123-1130.
Amendola, S. C., et al., "A Safe, Portable, Hydrogen Gas Generator Using Aqueous Borohydride Solution and Ru Catalyst", International Journal of Hydrogen Energy, 25(10), (2000), 969-975.
Amendola, Steven C., et al., "A Novel High Power Density Borohydride-Air Cell", Electrochemical Society Proceedings; ABSTRACT; vol. 98-15, (Nov. 1, 1998), 47-54.
Amendola, Steven C., et al., "An Ultrasafe Hydrogen Generator: Aqueous, Alkaline Borohydride Solutins and Ru Catalyst", ABSTRACT; Journal of Power Sources, vol. 85, No. 2, [Online]. Retreived from the Internet: <http://www.engadget.com/2010/02/03/horizon-debuts-h-cell . . . ,>, (Feb. 2000), 186-189.
Diaz, H., et al,, "Thermodynamic and Structural properties of LaNi5-yAly compounds and their related hydrides", International Journal of Hydrogen Energy, 4, (1979), 445-454.
Melanson, D., "Horizon debuts H-Cell 2.0 hydrogen fuel cell system for R/C cars", [online]. Retrieved from the Internet: <URL: http://www.engadget.com/2010/02/03/horizon-debuts-h-cell-2-0-hydrogen-fuel-cell-system-for-r-c-cars/>, (Feb. 12, 2010), 3 pgs.
Mendelsohn, M. H., et al., "The Effect of Aluminum Additions on the Structural and Hydrogen Absorption properties of AB5 Alloys with Particular reference to the LaNi5-xAlx Ternary Alloy System", Journal of the Less-Common Metals, 63, (1979), 193-207.
Pasaogullari, Ugur, "Liquid Water Transport in Polymer Electrolyte Fuel Cells with Multi-Layer Diffusion Media", Proceedings of IMECE04, 2004 ASME International Mechanical Engineering Congress and Exposition, Anaheim, California, (Nov. 13-20, 2004), 1-9.

\* cited by examiner

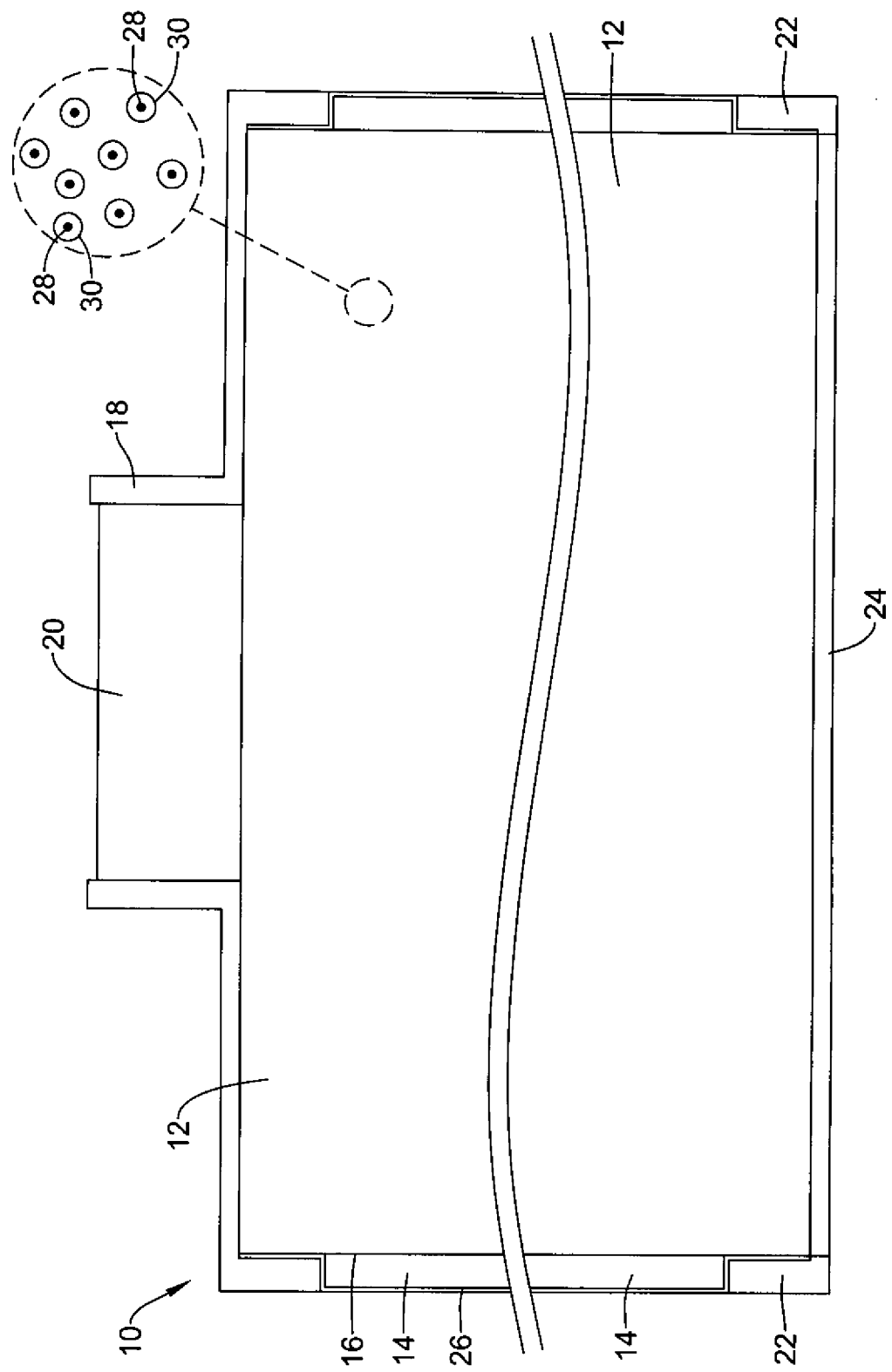

SHAPED FUEL SOURCE AND FUEL CELL

PRIORITY

This application is a continuation of Ser. No. 12/705,423, filed Feb. 12, 2010, which application is a continuation-in-part of U.S. patent application Ser. No. 12/335,352, filed Dec. 15, 2008, entitled "Metal Hydride Fuel Cell Power Generator", the entire disclosures of which are herein incorporated by reference.

RELATED APPLICATIONS

This application is related to U.S. patent application Ser. No. 12/705,383, filed on even day herewith and entitled "FUEL CELL", the entire disclosure of which is herein incorporated by reference.

TECHNICAL FIELD

The present disclosure relates generally to fuel cells, and more particularly, to fuel cell and/or components thereof, as well as methods of making fuel cells.

BACKGROUND

A wide variety of fuel cells have been developed. Of the known fuel cells, each has certain advantages and disadvantages. There is an ongoing need to provide alternative fuel cells.

SUMMARY

The disclosure relates generally to fuel cells, and more particularly, to fuel cells and/or components thereof, as well as methods of making fuel cells. An example fuel cell assembly includes a shaped fuel source that is formed into a desired shape. In some instances, the shaped fuel source may include a plurality of fuel source particles having a coating disposed thereon, but this is not required in all embodiments. The shaped fuel source may have an outer surface, with a fuel cell mounted directly on the outer surface of the shaped fuel source. In some instances, the fuel cell assembly may also include one or more of a cathode cap, an anode cap, a refill port, and an outer shell disposed around an exterior of the fuel cell assembly, but these are not required.

An example method for manufacturing a fuel cell assembly may include providing a fuel source, wherein the fuel source sometimes includes a plurality of fuel source particles having a corrosion-resistance coating. The fuel source may be formed into a desired shape that has an outer surface. A fuel cell may then be coupled to the outer surface of the fuel source, without an intervening container (and/or other thermal barrier) between the outer surface of the fuel source and the fuel cell.

The above summary is not intended to describe each disclosed embodiment or every implementation of the present disclosure. The FIGURES and Description which follow more particularly exemplify various illustrative embodiments.

BRIEF DESCRIPTION OF THE DRAWINGS

The invention may be more completely understood in consideration of the following description of various illustrative embodiments in connection with the accompanying drawing, in which:

FIG. 1 is a cross-sectional side view of an example fuel cell assembly.

While this disclosure is amenable to various modifications and alternative forms, specifics thereof have been shown by way of example in the drawing and will be described in detail. It should be understood, however, that the intention is not to limit the disclosure to the particular embodiments described. On the contrary, the intention is to cover all modifications, equivalents, and alternatives falling within the spirit and scope of the invention.

DESCRIPTION

The following description should be read with reference to the drawing. The drawing, which is not necessarily to scale, depicts an illustrative embodiment and is not intended to limit the scope of the invention.

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

FIG. 1 schematically illustrates an example fuel cell assembly 10. In the example shown, fuel cell assembly 10 includes a shaped fuel source 12. A flexible fuel cell 14 is shown disposed on, mounted to, wrapped around, or otherwise coupled directly to an outer surface 16 of shaped fuel source 12. In some instances, fuel cell assembly 10 may include a cathode cap 18. A refill port (and/or refill plug or valve) 20 may be disposed in or part of cathode cap 18. Fuel cell assembly 10 may also include an anode ring 22 and/or an anode cap 24. In some instances, fuel cell assembly may be housed within a shell or can 26 as shown.

In some cases, the fuel cell 14 directly engages the outer surface 16 of the shaped fuel source 12. In some instances, the fuel cell 14 may be wrapped around the outer surface 16 of the shaped fuel source 12 and secured so that there is direct mechanical pressure forcing the fuel cell 14 into engagement with the outer surface 16 of the shaped fuel source 12. In some cases, the shell or can 26 may be used to force the fuel cell 14 into direct engagement with the outer surface 16 of the fuel source. In some cases, the outer surface 16 of the shaped fuel source 12 may include an adhesive coating or the like, and the fuel cell may be directly secured to the outer surface 16 of the shaped fuel source 12 via the adhesive coating. These are just some illustrative embodiments.

Shaped fuel source 12 may be formed from any number of different materials. For example, shaped fuel source 12 may include a metal hydride. Such materials may be desirable, for example, because it may be possible to recharge these materials with hydrogen. Example metal hydrides may include $LaNi_5H_5$, $FeTiH_2$, $Mg_2NiH_4$, and $TiV_2H_4$. Example reversible chemical hydrides, which may also be used, include but are not limited to $NaAlH_4$, $LiAlH_4$, $Mg(AlH_4)_2$, $Ti(AlH_4)_4$, $Fe(BH_4)_4$, $NaB_4$, and $Ca(BH_4)_2$. Other materials are also contemplated for the shaped fuel source 12. It is contemplated such a shaped fuel source 12 may be compressed, molded, cast, or otherwise formed into a desired shape, as desired.

In at least some embodiments, shaped fuel source 12 may be particulate in nature and, thus, may include a plurality of particles 28. These particles 28 may be compressed, molded, cast, or otherwise formed into a desired shape, as desired. The desired shape may depend on the desired application. In the illustrative embodiment of FIG. 1, the shaped fuel source 12 is shaped into a cylindrical shape. However, other shapes are contemplated including rectangular shaped, prism shaped, or any other suitable shape or shape combination as desired. In some instances, the shaped fuel source 12 may be shaped to resemble the shapes of commonly used alkaline and/or lithium ion batteries such as AAA, AA, C, or D batteries, but this is not required.

In some instances, a coating 30 may be disposed on the shaped fuel source 12, and when provided, on particles 28. Coating 30 may be an anti-corrosion coating and/or a coating that may help preserve the structural integrity of a shaped fuel source 12, and/or prevent breakdown of the fuel source (e.g. particles 28). In at least some embodiments, coating 30 may include copper. An example process for coating particles 28 is described below in Example 1. In at least some embodiments, particles 28 of the shaped fuel source 12 are formed into the desired shape after the coating process, but this is not required.

Fuel cell 14 may be coupled directly to the outer surface 16 of the shaped fuel source 12. More particularly, and in some cases, shaped fuel source 12 (in some cases particles 28 coated with coating 30) may be formed into the desired shape, and the fuel cell 14 may be disposed on the outer surface of the shaped fuel source 12. This may include disposing fuel cell 14 directly onto the outer surface 16 of the shaped fuel source 12. Such a fuel cell assembly 10 may be described as being free from a thermal interface structure, container, or any other structure between shaped fuel source 12 and fuel cell 14. This may be desirable for a number of reasons. For example, because less structure is used, the overall material cost of fuel cell assembly 10 may be reduced. In addition, because a thermal interface structure, container, or any other structure may be left out, a larger fuel source 12 may be utilized for a given fuel cell assembly 10. Thus, fuel cell assembly 10 may have a greater amount of fuel on board and available for providing power. Other desirable features may be associated with mounting fuel cell 14 directly on the outer surface of the shaped fuel source 12 including a lower mass transfer and a lower thermal resistance path between the shaped fuel source 12 and the fuel cell 14.

It is contemplated that fuel cell 14 may include any number of different structures. For example, fuel cell 14 may include a pair of electrodes (e.g., a cathode and an anode) with one or more layers disposed therebetween. Such layers may include one or more gas diffusion layers (e.g., conductive material, porous electrically conductive material, carbon fabric, or the like), a proton exchange membrane (PEM) (or membrane electrode assembly (MEA), which may include a carbon and/or platinum coated conductive material or the like. These various layers may be stacked into a planar structure, with the anode electrode on top and the cathode electrode on the bottom. In FIG. 1, the anode electrode of the fuel cell 14 may be situated adjacent the shaped fuel source 12, and the cathode electrode may be adjacent the shell or can 26, but this is just an example. In some embodiments, fuel cell 14 may be a fuel cell stack similar to those described in U.S. patent application Ser. No. 12/705,383, filed on even day herewith and entitled "FUEL CELL", the entire disclosure of which is herein incorporated by reference. It is contemplated that other arrangements and structures may be utilized for fuel cell 14, as desired.

As alluded to above, fuel cell assembly 10 may include one or more additional structures. For example, this may include a cathode cap 18, a refill port and/or refill plug or valve) 20, an anode ring 22 and/or anode cap 24, and/or a shell or can 26. Cathode cap 18 may be formed as a structure that may help fuel cell assembly 10 connect to an appropriate cathode terminal (e.g., "+" terminal). Likewise, anode ring 22 and/or anode cap 24 may help fuel cell assembly 10 connect to an appropriate anode terminal (e.g., "−" terminal). Refill port 20 may serve as a port through which hydrogen may be infused into the shaped fuel source 12 to recharge the shaped fuel source 12. The shell or can 26 may surround the exterior of fuel cell assembly 10 and help provide structural integrity as well as help insulate and/or seal fuel cell assembly 10. In some instances, the shell or can 26 may be threaded on both the top and bottom ends so as to be threadably engaged with a cathode cap 18 and an anode cap 24, but this is not required.

EXAMPLES

The following examples serve to exemplify some illustrative embodiments, and are not meant to be limiting in any way.

Example 1

An example process for coating metal hydride particles such as particles 28 of FIG. 1 includes:

In a first container dissolving 3.5 g $CuSO_4$ in 50 ml water. 0.5 g ethylenediamine tetraacetic acid (EDTA) are then added to the first container. The $CuSO_4$ solution/EDTA is then heated at 50° C. while agitating for 30 minutes to form the coating solution.

In a second container 27.9 g $LaNi_{4.25}Al_{0.75}$ powders are wetted with 0.63 g (about 0.79 cc) ethanol. A total of 1.3 g (about 1.59 cc) formaldehyde is added dropwise to the second container and the mixture is agitated to make it uniform.

In a combined container, the wetted $LaNi_{4.25}Al_{0.75}$ and the coating solution is combined and the combination is agitated intensively for 10 minutes. The $LaNi_{4.25}Al_{0.75}$ powders are filtered out and rinsed five times with deionized water. The powders are then dried naturally in air. The powders are now coated, and are compressed into a desired shape (e.g., with a top compressive pressure of about 20 MPa).

It should be understood that this disclosure, in many respects, is only illustrative. Changes may be made in details, particularly in matters of shape, size, and arrangement of steps without exceeding the scope of the invention. The invention's scope is, of course, defined in the language in which the appended claims are expressed.

What is claimed is:

1. A method for manufacturing a fuel cell assembly, the method comprising:
   providing a fuel source, the fuel source including a plurality of fuel source particles having a corrosion-resistance coating;

forming the fuel source into a desired shape that has an outer surface; and coupling a flexible fuel cell anode electrode to the outer surface of the fuel source without an intervening container between the outer surface of the fuel source and the fuel cell, wherein the flexible fuel cell anode electrode conforms to the shape of the fuel source.

2. The method of claim 1, wherein fuel source is particulate in nature and includes a plurality of fuel source particles having a coating disposed thereon.

3. The method of claim 1, wherein fuel source includes a metal hydride.

4. The method of claim 1, wherein the corrosion-resistance coating includes copper.

5. The method of claim 1, wherein coupling the flexible fuel cell to the outer surface of the fuel source includes disposing the flexible fuel cell directly onto the outer surface of the fuel source.

6. The method of claim 1, wherein the flexible fuel cell assembly is free of a thermal interface between the fuel source and the flexible fuel cell.

7. The method of claim 1, wherein forming the fuel source into a desired shape includes casting.

8. The method of claim 1, wherein forming the fuel source into a desired shape includes molding.

9. The method of claim 1, wherein forming the fuel source into a desired shape includes forming the fuel source into a substantially cylindrical shape.

10. The method of claim 1, wherein the flexible fuel cell is secured to the outer surface of the shaped fuel source so that there is mechanical pressure forcing the flexible fuel cell into engagement with the outer surface of the shaped fuel source.

11. The method of claim 1, wherein the flexible fuel cell is secured to the outer surface of the shaped fuel source using an adhesive.

12. The method of claim 1, further comprising coupling a flexible fuel cell cathode electrode to an outer shell.

* * * * *